United States Patent [19]
Doerter

[11] Patent Number: 5,370,895
[45] Date of Patent: Dec. 6, 1994

[54] PROCESS FOR EXTENDING THE SHELF-LIFE OF SHELLFISH PRODUCTS

[75] Inventor: Carl R. Doerter, Scranton, N.C.

[73] Assignee: Hurry Hut, Inc., Scranton, N.C.

[21] Appl. No.: 122,203

[22] Filed: Sep. 15, 1993

Related U.S. Application Data

[63] Continuation-in-part of Ser. No. 861,447, Apr. 1, 1992, Pat. No. 5,268,189.

[51] Int. Cl.$^5$ ............... A23L 1/0532; B65B 55/02; A23B 4/005
[52] U.S. Cl. ..................... 426/573; 426/407; 426/412; 426/575; 426/643
[58] Field of Search ............ 426/106, 132, 393, 407, 426/412, 521, 524, 573, 642, 643, 652, 575

[56] References Cited

U.S. PATENT DOCUMENTS 5,063,073 11/1991 Kratochvil .................. 426/573

FOREIGN PATENT DOCUMENTS 2121752 1/1984 United Kingdom ............... 426/412

Primary Examiner—Leo B. Tentoni
Attorney, Agent, or Firm—Olive & Olive

[57] ABSTRACT

The process disclosed relates to the preservation of shellfish products so as to extend their shelf-life. A thermally conductive mixture which forms a liquid barrier upon heating and a gel upon cooling is introduced to the shellfish container for packaging. Specific steps of heating to kill bacteria and other undesirable microorganisms and subsequent rapid cooling are required. Ultimate refrigeration of the packaged product is undertaken for long-term storage. In a second preferred embodiment, the gel-forming mixture is added to the shellfish product in the container to a height of approximately 83% of the can height, a vacuum is applied, and the can is sealed. The sealed can is heated in a retort to kill all microorganisms and to partially cook the shellfish to attain a shellfish product which is shelf stable without requiring refrigeration.

13 Claims, 2 Drawing Sheets

PROCESS FOR EXTENDING THE SHELF-LIFE OF SHELLFISH PRODUCTS

This is a continuation-in-part of co-pending U.S. patent application Ser. No. 07/861,447, filed Apr. 1, 1992, bearing an identical title.

FIELD OF THE INVENTION

The present invention relates to the field of food processing and preservation and, more particularly to the preservation of seafood and shellfish.

BACKGROUND OF THE INVENTION

Shellfish, such as crab, shrimp, lobster and the like have a number of unique characteristics. Shellfish meat has a characteristic taste and texture. Shellfish are typically cooked in a manner different than that of other meat or fish products. Shellfish tend to spoil relatively quickly in storage due to the usual presence of spoilage bacteria, such as *Listeria monocytogenes*. In addition, such microorganisms as infectious *Staphylococcus, Salmonella* and other potentially pathogenic microorganisms are frequently present.

There have been attempts to improve the storage life of shellfish which have resulted in various degrees of failure. Although freezing deters spoilage, freezing also results in deterioration of shellfish texture and taste. Shellfish meat removed from the shell may be effectively pasteurized, but such method has not been usable on meat in the shell because when done in water, the meat becomes saturated and when done in air, the meat is cooked. Saturated shellfish meat loses both taste and texture due to cell rupture or degradation. Cooking is not desired in this process because the consumer usually wishes to purchase a fresh, uncooked product, or, if the shellfish product is to be purchased after cooking, pasteurization causes overcooking of the already cooked shellfish.

Because of the ineffectiveness of prior attempts to extend shellfish shelf-life known in the industry, the acceptable shelf-life of shellfish in the shell under refrigeration is a maximum of 7-10 days. Storage of shellfish without refrigeration has not been possible. This means that a restaurant or retail store which sells shellfish must obtain fresh supplies of shellfish at least weekly, and must dispose of the older product.

The short shelf-life of in-the-shell shellfish products also requires the consumer to be wary of the possibility of purchasing a shellfish product that is at or near its expiration time and, if the shellfish product is purchased in good time, to use the shellfish fairly quickly. The shelf-life problem is substantially similar whether the shellfish are fresh or cooked.

As used herein, the terms "shellfish" and "shellfish product" are used interchangeably and refer to either the entire shellfish or to the shellfish meat portions removed from the shell.

Therefore, an objective of the invention is to provide a process for extending the shelf-life of shellfish.

An additional objective of the invention is to provide a process which retains the natural flavor and texture of a shellfish product.

A further objective of the invention is to provide a process which is effective with either fresh or cooked shellfish.

These and other objectives of the invention disclosed will become apparent to those skilled in the art as the description below is understood.

SUMMARY OF THE INVENTION

The invention disclosed relates to the processing of shellfish products to extend the useful shelf-life beyond that presently available. In a first embodiment, the fresh or cooked shellfish product is packed in a container into which is poured a solution effective as a heat transfer medium and as a liquid barrier after which the container is sealed. The sealed container is heated sufficiently to kill the natural bacteria and then chilled quickly. The container is then quickly subjected to refrigeration for long-term storage.

According to a second embodiment of the invention process, the shellfish product is packed into the can in the uncooked condition. The solution which is effective as a heat transfer medium and liquid barrier is added to a height of about 5/6 of the can height so as to leave about a 1/6 height top space. A vacuum is applied to the can and contents and the can is sealed. The filled can is heated in a retort until an internal product temperature of between 113°–122° C. (235°–250° F.) has been reached. The product is then cooled and may be stored without refrigeration.

DESCRIPTION OF THE PREFERRED EMBODIMENTS OF THE INVENTION

The invention involves a series of specific processing steps as are illustrated in the form of a flowchart for each of the embodiments described. The initiation of the process occurs after the shellfish have been prepared for packaging. The shellfish products to which this invention applies include edible crustaceans such as crab, shrimp, crawfish, lobster and the like which are to be preserved in the shell or removed from the shell. Preparation for packaging typically includes washing and eviscerating the shellfish, if the product is to be packed fresh. Additionally, if the shellfish are to be cooked, the cooking is done prior to the beginning of the process of the invention. Whether the shellfish product is cooked or not, the steps disclosed below are followed after washing and eviscerating.

Figure 1:
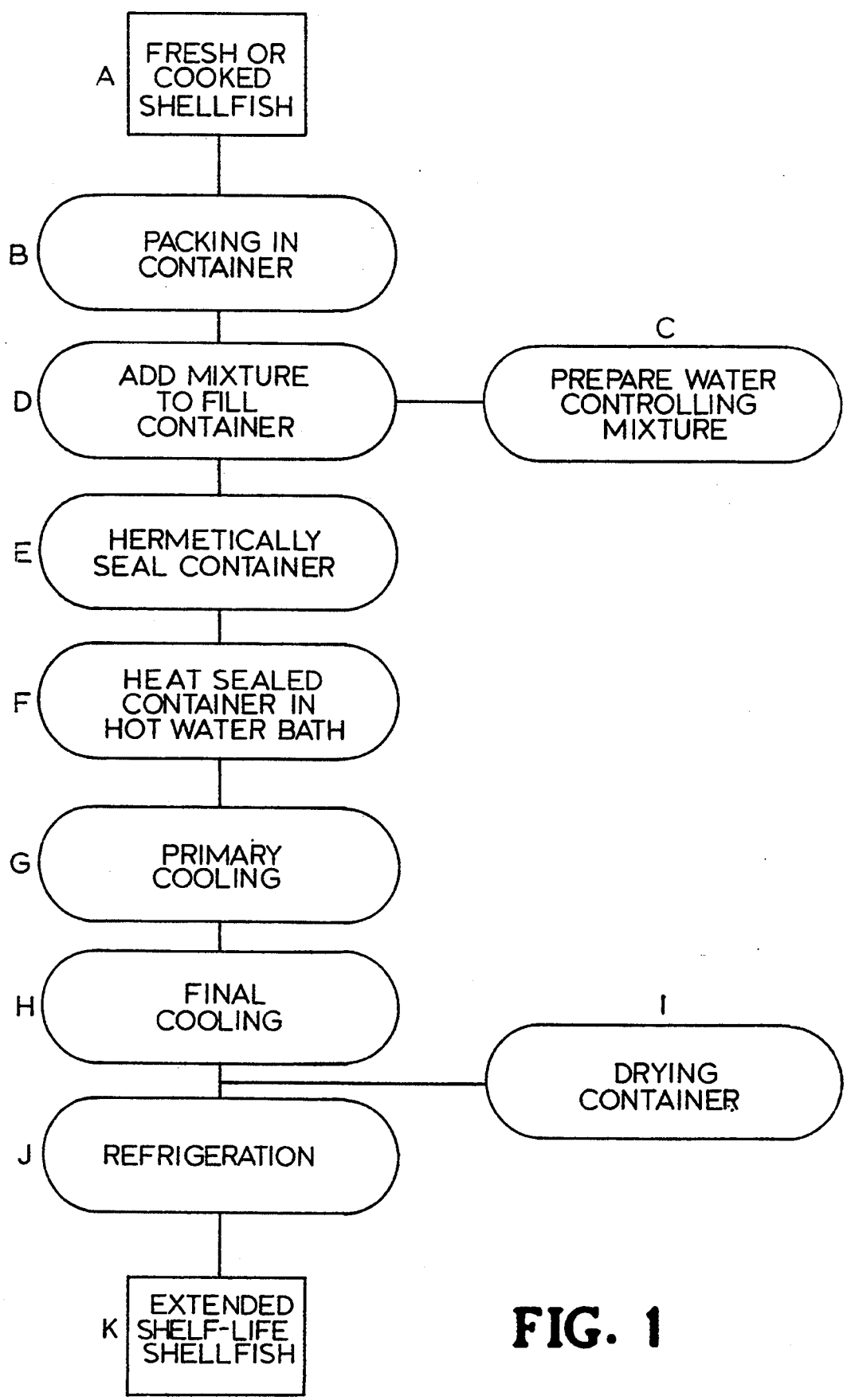
FIG. 1 is a flowchart of the steps involved in the first embodiment process of the invention.

In FIG. 1, Step A of the first preferred embodiment represents the shellfish product to be packed with its shell. In Step B, the shellfish product is packed into a container, such as a number 10 commercial metal can, or, alternatively, a plastic container which is capable of being hermetically sealed. The plastic container may be rigid or flexible, such as a pouch. No special care need be taken to pack the product tightly or to eliminate air from the package. Plastic containers of, for example, high density polyethylene resin have been shown to withstand the process of the invention and to be hermetically sealable. However, plastic containers are generally less thermally conductive than metal containers.

After the shellfish product is in the container, a water-controlling mixture having specific temperature-sensitive response and water barrier characteristics must be prepared and added in Step C. In general, the mixture is capable of readily transferring heat to or from the product and upon heating forms a water entrapping matrix which acts as a barrier to liquid transfer to or from the product. Upon cooling, the mixture forms a gel which prevents loss of fluid from the shellfish. It is contemplated that any mixture having these characteristics and being acceptable for use in food products may be used in the instant invention.

In the first and second preferred embodiments of the invention, the mixture is prepared by adding carrageenan (e.g. Irish moss extract) to water. Carrageenan is a food additive substance available from FMC Corporation of Philadelphia, Pa. and approved by the United States Federal Food and Drug Administration. Carrageenan is added to water at a concentration of $\frac{1}{4}\%$ to $2\frac{1}{2}\%$ based on the combined weight of the shellfish product and the water; the preferred mixture contains 1% carrageenan. Mixing takes place at a temperature of between 1°-22° C. (34°-71° F.), preferably 10° C. (50° F.). Thorough mixing and blending of the carrageenan into the water is essential to successful results. The mixture is best kept at a temperature of 1°-12° C. (34°-55° F.) so as to minimize precipitation until it is used.

The prepared mixture of water and carrageenan is added to the container into which the shellfish have been placed (Step D). The mixture fills the container and effectively forces any air from the container, leaving only shellfish and the carrageenan mixture.

In Step E of the first preferred embodiment process, the container is sealed hermetically. This is accomplished by any commercial or proprietary process. It is important that the quantity of prepared mixture is correct in order to avoid entrapment of air and to not interfere with the proper closure of the container.

The next procedure is pasteurization (Step F). In order to effectively kill the naturally occurring harmful microorganisms, such as *Salmonella, Staphylococcus,* or other pathogens, the temperature must be raised to between about 66°-94° C. (150°-200° F.). When the shellfish is packaged in a metal can, a temperature of 84° C. (185° F.) is preferred. If the container selected is of plastic, the composition of the plastic may restrict the temperature that may be used. With the preferred high density polyethylene plastic material, a temperature of 82° C. (180° F.) is applied.

As the filled containers are being heated, the carrageenan begins to create a moisture entrapping crystalline-like network beginning at a temperature of about 15° C. (59° F.), which condition prevails throughout the balance of processing and storage.

In order to achieve good thermal transfer to the containers and their contents, a heating medium, such as a heated liquid bath surrounds the sealed containers during this pasteurization step. It is recognized that liquids generally are better heat transfer media than gases. The surrounding liquid, preferably water, is recirculated and aerated at the same time. The recirculation takes place at a rate of not less than 38 liters (ten gallons) per minute with simultaneous introduction of air at a pressure of not less than 140 g/sq.cm (2 psi) through apertures distributed throughout the floor of the heating tank. This aerating and circulating procedure ensures a uniform heat distribution in the liquid bath and maximizes the speed of heat transfer to the product and mixture.

The time of processing in the heated bath is dependent on a number of factors, including, but not limited to the size of the bath, the number of containers in the bath, the size and thermal conductivity of the individual containers, the temperature of the bath, etc. as is known in the art. The ultimate determination of completeness of the pasteurization is whether the pathogenic microorganisms have been killed. The microorganisms involved in the spoilage process are not necessarily affected by the degree of heat to which the product is exposed in the process of pasteurization. Effective pasteurization may be accomplished generally by keeping metal containers of shellfish in the heated bath for approximately 40 minutes (longer for plastic containers) as is known in the art. This heating process is designed to achieve a 31-minute lethality according to the guidelines of the National Blue Crab Institute of America.

Following the pasteurization step described above, the containers are removed from the heated bath and placed into a primary cooling bath according to Step G for rapid removal of the acquired heat. The temperature of the primary cooling bath is in the range of about 13°-27° C. (55°-80 F.). A temperature of 16° C. (60° F.) is considered optimal. Optionally, recirculation and aeration may be employed in the primary cooling step to keep the temperature uniform, improve heat transfer from the containers and decrease immersion time. The time required in this step to cool the heated containers is dependent on the factors enumerated above in regard to heating.

According to this first preferred embodiment, at the conclusion of the primary cooling step G, the containers are transferred to a final cooling bath in step H. The final cooling bath liquid is maintained in the range of 2°-8° C. (34°-45° F.), the preferred liquid temperature being 5° C. (40° F.). Recirculation and aeration provide similar benefits as discussed above and may be employed. This cooling step is performed long enough that the internal temperature reaches 9° C. (48° F.) or less.

During the process described above, the carrageenan-based mixture goes through a change in physical characteristics. The mixture upon heating forms into a semi-solid crystalline matrix which effectively absorbs the water in which it was mixed. It therefore prevents liquid transfer to and from the shellfish and upon subsequent cooling, the mixture becomes firm and exhibits properties like a gel. The degree of firmness will vary with the proportions of the mix. Once hardened, the gel does not give any of its liquid to the shellfish product and does not absorb any moisture from the product. In this manner, the gel serves to encapsulate and preserve the product so that the taste and the texture of the shellfish is preserved and its shelf-life extended.

After removing the container from the final cooling bath of Step H, it is generally desirable to dry the exterior of the container prior to placing the container into cartons. This drying is to prevent rust when a metal container is used, and to keep the carton from being saturated. Exterior drying does not affect the product.

Within 30 minutes of the completion of the final cooling step, it is important to place the packaged product into a refrigerated environment (Step J). The refrigeration temperature must be maintained at between about 0°-8° C. (32°-45° F.). To optimize the benefits of the process disclosed, refrigeration is maintained until the product is ready for consumption. Shelf-life under proper refrigeration prevents liquid transfer and cellular degradation and retains original taste. According to industry practice, an indication of packaging date or expiration date is marked on the individual containers. When the shellfish is removed the container prior to consumption, the carrageenan gel is removed easily by rinsing with water.

Figure 2:
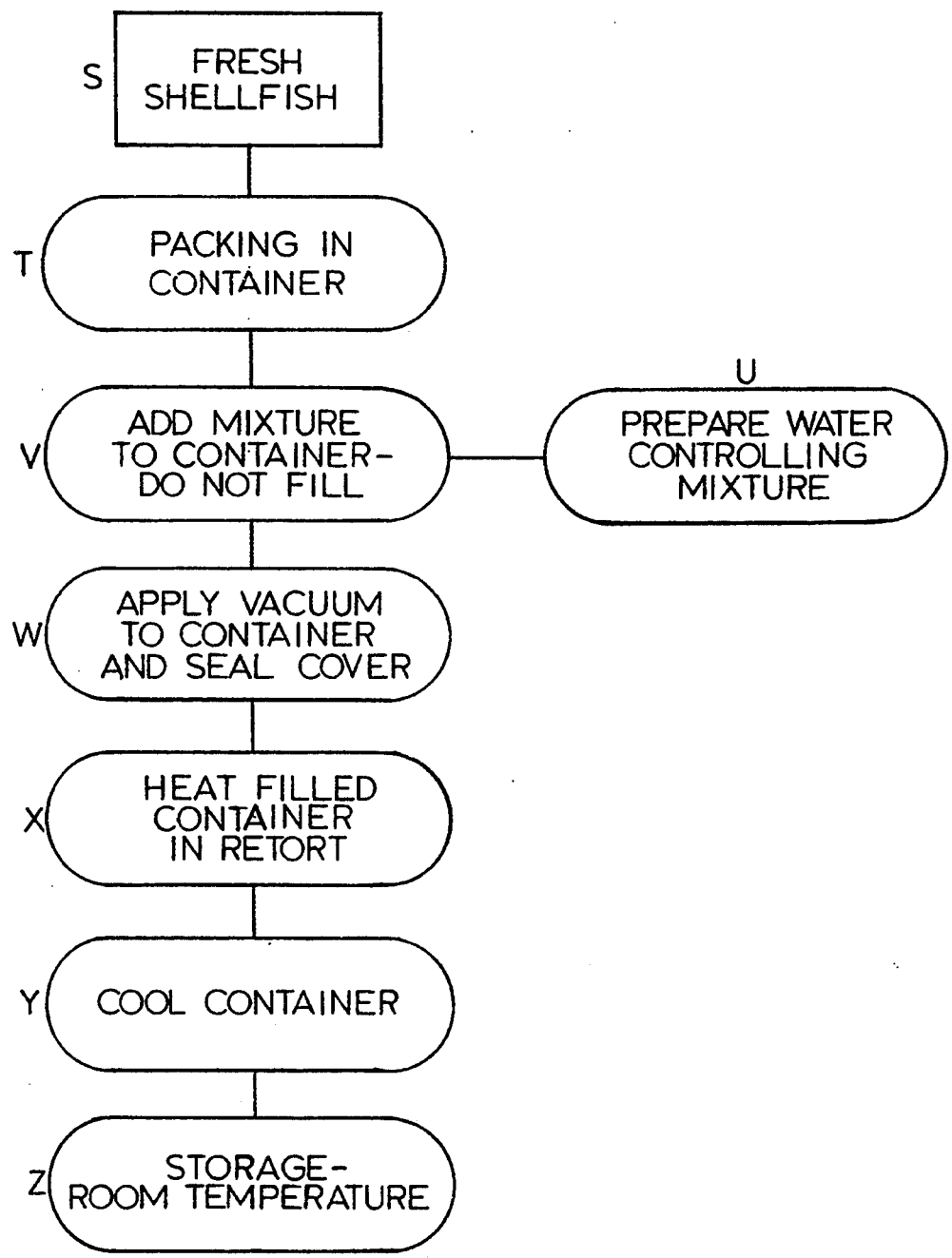
FIG. 2 is a flowchart of the steps involved in the second embodiment process of the invention.

A second preferred embodiment of the invention process is illustrated in the form of a flow chart in FIG. 2. As is seen by comparison of the flowcharts of the first (FIG. 1) and the second (FIG. 2) preferred embodiments of the invention, there are significant differences between the embodiments.

Step S and step T of FIG. 2 are analogous to steps A and B of FIG. 1, respectively except that the shellfish product is always fresh in step S of the second embodiment. In this second preferred embodiment the container used is preferred to be metal due to the higher processing temperature involved. The Carrageenan mixture is prepared in step U as described above, and is added to the shellfish-filled can in step V, to a height of between approximately 75%–90% of the height of the can. This partial filling will leave an air space at the top potion of the can of between 10%–25% of the height of the can. The preferred filling height is to about 83% of the height of the can.

In step W of FIG. 2, a vacuum is applied to the open top portion of the can and its contents, and the cover of the can is then sealed in place to maintain a vacuum condition within the sealed can. The preferred degree of vacuum applied to the can prior to sealing is in the range of between 10–25 cm (4–10 in.) water below atmospheric pressure, with an optimum vacuum of 18 cm (7.5 in.) water below atmospheric pressure.

According to step X, the vacuum sealed can is placed in a retort, or pressure sealed cooking vessel, so that it is heated sufficiently to kill the disease-causing microorganisms as well as the spoilage microorganisms. Heating takes place until the shellfish product has achieved a central internal product temperature of between 113°–122° C. (235°–250° F.). The operative temperature in the retort is equal to or slightly greater than that of the target internal shellfish temperature. At this degree of temperature, the shellfish product is essentially cooked, the above mentioned microorganisms are completely killed and all potential disease and degradation processes are eliminated. After cooking is completed, the cooling of step Y may occur at a rapid or a slow rate, depending on the production cycle plan. Thereafter, the shellfish product, maintained in its sealed can, may be stored for a substantial period of time without the need for refrigeration, as indicated in step Z of FIG. 2.

A heating process involving a sealed container generally will tend to cause an increase in internal pressure and distortion of the can surfaces by bulging, A benefit of the application of a vacuum prior to the sealing of the can is to counteract the bulging tendency and keep the can in the form of a cylinder with a flat top and bottom. A second benefit of applying a vacuum prior to sealing the can closed is to reduce the amount of oxygen present, which will help maintain the natural color of the shellfish product during the cooking and storage steps.

A variation on the process described in the second preferred embodiment above is used for a finely chopped shellfish product, such as crab stuffing or crab cake material. The two processes disclosed above in the first and second preferred embodiments utilize a Carrageenan mixture to fill the interstices between the relatively large pieces of shellfish meat so as to substantially eliminate air contact with the meat. In the case of a chopped shellfish product, space for air inclusion is essentially non-existent. Therefore, the need for a filler in the can is negligible.

On this basis, the chopped shellfish process is carried out in identical fashion to the second preferred embodiment disclosed above, with the elimination of steps U and V, which are the steps consisting of preparing aria adding the Carrageenan mixture to the canned shellfish.

By the processes disclosed herein, the major objectives of the invention have been satisfied. The specific examples used herein as part of the preferred embodiments are not intended as limitations upon the scope and principle of the invention.

What is claimed is:

1. A process for extending the useful unrefrigerated shelf-life of shellfish, comprising:
   (a) packing a shellfish product in a hermetically sealable container;
   (b) preparing a liquid mixture comprising a heat actuated water-controlling gel-forming composition;
   (c) pouring a quantity of said mixture into said container;
   (d) applying a vacuum to the interior of said container and said shellfish product;
   (e) hermetically sealing said container so as to retain an internal vacuum condition;
   (f) heating said sealed container including said shellfish product and said mixture to a temperature at which said mixture becomes a moisture entrapping matrix around said shellfish product;
   (g) further heating sealed container including said shellfish product and said mixture until a selected central internal product temperature is reached; and
   (h) cooling said sealed container and said included shellfish product.

2. The process according to claim 1 in which said heat actuated water-controlling gel-forming composition comprises a water mixture of carrageenan Irish moss extract.

3. The process according to claim 1 in which said vacuum is applied at approximately 18 cm water below atmosphere.

4. The process according to claim 1 in which said mixture is prepared at a temperature between 1°–22° C.

5. The process according to claim 4 in which said temperature is approximately 10° C.

6. The process according to claim 1 in which said selected central internal product temperature is between 113°–122° C.

7. The process according to claim 1 in which said mixture is poured into said container to a level of approximately 83% of the height of the container.

8. A process for extending the useful unrefrigerated shelf-life of shellfish, comprising:
   (a) packing a shellfish product and a water controlling gel-forming liquid mixture in a hermetically sealable container;
   (b) applying a vacuum to the interior of said container and said shellfish product;
   (c) hermetically sealing said container so as to retain a vacuum condition therein;
   (d) heating said sealed container including said shellfish product and said mixture until a selected central internal product temperature is reached; and
   (e) cooling said sealed container and said included shellfish product.

9. The process according to claim 8 wherein said water controlling gel-forming liquid mixture comprises a water mixture of carrageenan Irish moss extract.

10. A process for extending the useful unrefrigerated shelf-life of shellfish, comprising:
   (a) packing a shellfish product in a hermetically sealable container;
   (b) preparing a liquid mixture comprising a heat actuated water-controlling gel-forming composition at a temperature between 1°–22° C.;
   (c) pouring a quantity of said mixture into said container;
   (d) applying a vacuum to the interior of said container and said shellfish product;
   (e) hermetically sealing said container so as to retain a vacuum condition therein;
   (f) heating said sealed container including said shellfish product and said mixture until a selected central internal product temperature is reached; and
   (g) cooling said sealed container and said included shellfish product.

11. The process according to claim 10 in which said mixture preparation temperature is approximately 10° C.

12. The process according to claim 10 in which said gel forming composition is a water mixture of carrageenan Irish moss extract.

13. The process according to claim 10 in which said selected central internal product temperature is between 113°–122° C.

* * * * *

UNITED STATES PATENT AND TRADEMARK OFFICE
CERTIFICATE OF CORRECTION

PATENT NO. : 5,370,895
DATED : December 6, 1994
INVENTOR(S) : Carl R. Doerter

It is certified that error appears in the above-indentified patent and that said Letters Patent is hereby corrected as shown below:

Column 4, line 68, after "removed" insert --from--.

Column 5, line 19, correct "potion" to read --portion--.

Column 6, line 6, correct "aria" to read --and--.

Signed and Sealed this

Twenty-first Day of February, 1995

Attest:

BRUCE LEHMAN

Attesting Officer      Commissioner of Patents and Trademarks